UNITED STATES PATENT OFFICE.

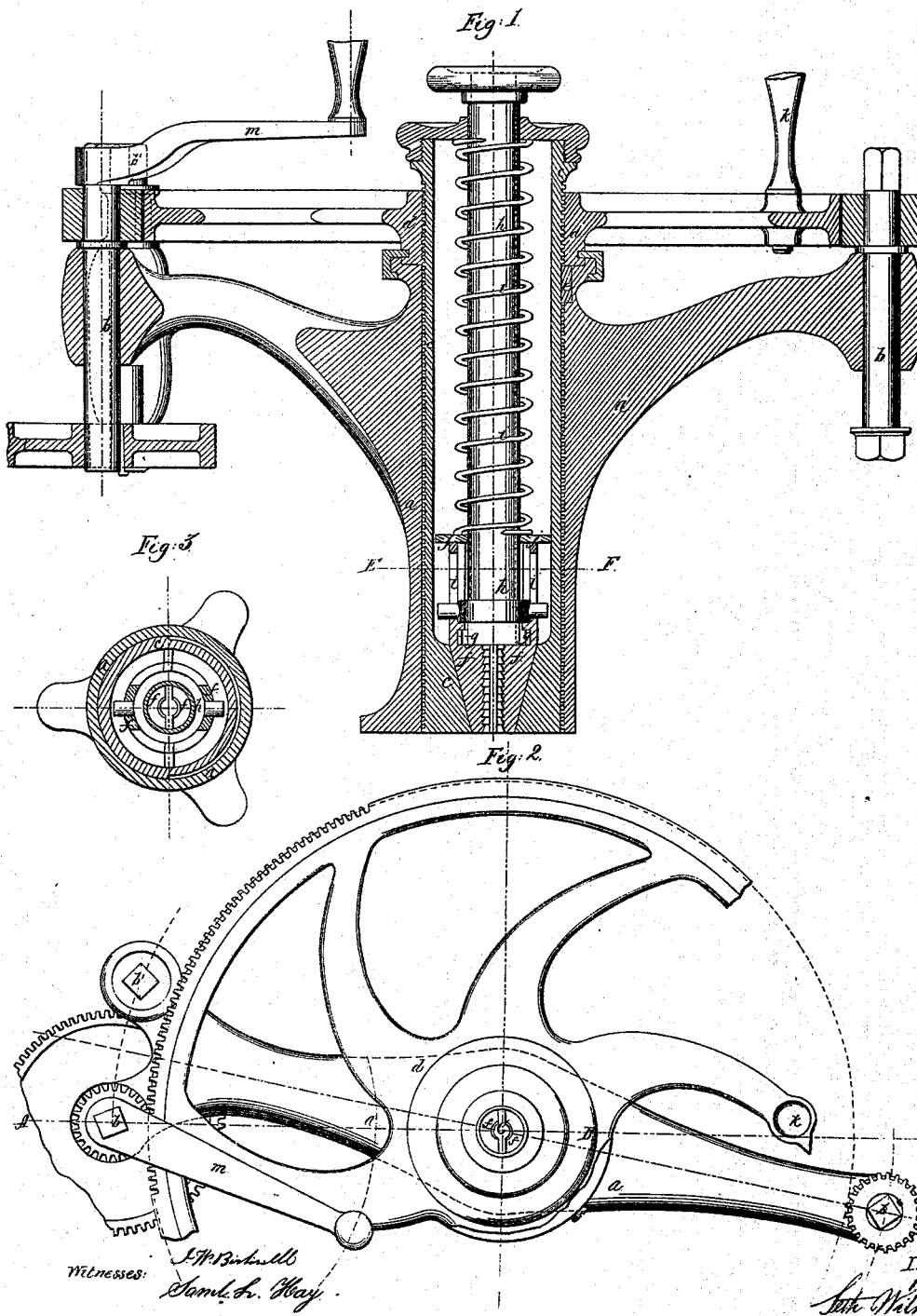

SETH WILMARTH, OF CHARLESTOWN, MASSACHUSETTS.

MACHINE FOR DRAWING BOLTS.   REISSUED

Specification of Letters Patent No. 26,315, dated November 29, 1859.

*To all whom it may concern:*

Be it known that I, SETH WILMARTH, of Charlestown, in the county of Middlesex and State of Massachusetts, have invented a new and useful machine, which I denominate "Bolt-Drawing Forceps," designed for use in the repair of ships and other vessels to draw from their timbers or frames the bolts or fastenings used to secure the planking to the timbers or for other similar purposes and drawing them in such manner as not to bend or mar them, thereby spoiling them for their legitimate use.

It is well known that the common method of drawing such bolts, bends and mars them in such manner and degree that they are unfit for further use, which is a great loss, particularly when the bolts are made of copper, which is the case to a great extent in Government vessels, and also injures the timbers by splitting them, and leaving an irregular hole to be plugged.

To overcome these objections is the object of my invention, and to enable others skilled in the art to make and use my invention, I will proceed to describe its construction and operation; and I do hereby declare that the following is a full and exact description thereof—reference being had to the accompanying drawings and to the letters of reference marked thereon.

Figure 1 is a vertical and sectional elevation of the machine on lines A B and C D of Fig. 2. Fig. 2 is a part plan of the same. Fig. 3 is a transverse section at the line E F of Fig. 1.

The part, $a$, is of a cylindrical form having arms or projections from its sides for the support of the shafts or axles, $b$, it also forming a case or covering for the screw, $c$, and a rest or bearing for the nut $d$. In the part, $a$, is fitted a feather, $e$, to prevent the screw, $c$, from turning with the nut, $d$. The screw, $c$, is made hollow to allow of the peculiar arrangement of the jaws or dies, $f$, and also to permit the bolt being drawn, to pass unobstructed through it, one end of said screw (internally) being in the form of the frustum of a cone, for the reception of the jaws or dies $f$.

The jaws or dies, $f$, are for holding the bolt, and are made of steel, and tempered, their external surfaces being fitted to the conical cavity at one end of the screw, $c$, the inner surfaces of the jaws are serrated or have teeth cut upon them which act upon the bolt to be drawn, above the serrated portion of the jaws are recesses in which is placed a spring, $g$, that causes the jaws to open while being drawn out by the pipe, $h$, on each of these jaws are bails or handles by which they may be drawn out or forced in upon the bolt. The transverse section of these jaws may be rectangular or other shape than that shown in the drawings.

The ram, $h$, is made a pipe to allow the bolt to be drawn to pass through it, and having on its opposite sides projections by which to form the connection between the jaws and ram. The spiral-spring, $i$, is for the purpose of retaining the several parts in their proper places, and also to close the jaws upon the bolt.

The washer, $j$, forms the connection between the spring, $i$, and the jaws, $f$.

The purpose of the handle, $k$, is to return the screw to its position for taking hold of the bolt without loss of time, and is to be removed when the cranks, $m$, are in use, one of which only is shown in the drawing.

The axle, $b'$, and its pinion, gearing with the wheel, $o$, are to be used for multiplying the power when required.

The pinions, $n$, on opposite sides of the large wheel or nut, $d$, are for the convenience of two men working at the same time if required.

The operation of the machine is as follows, viz., on its being applied to a bolt, the jaws, $f$, are drawn back upon the inclined surface upon which they rest, by the pipe or ram, $h$, being at the same time forced apart or opened by the spring, $g$, they are then ready to receive the bolt. The machine being placed, the jaws are made to grip the bolt by being forced or driven upon it by the pipe or ram, $h$, which is free to move the length of the slots or openings in the bails or handles marked, $l$. The machine is now ready for operation, and power being applied to the hollow screw, through the gearing as shown in the drawing will cause the jaws to grasp the bolt so firmly as to remove it, if power is continued to be applied. If the bolt to be drawn is longer than can be drawn at one pull, the screw may be turned back and a new hold taken, and the process continued.

After the bolt is removed the pinions, $n$, are thrown out of gear, and the screw run back to its position for receiving another bolt, by the handle, *k*, when it is again ready for operation.

What I claim as my invention, and desire to secure by Letters Patent, is—

The combination, and arrangement of the several parts herein specified and illustrated, substantially as, and for the purposes set forth.

SETH WILMARTH.

Witnesses:
I. GILES,
WM. C. HUBBARD.